US008842541B2

(12) United States Patent
Shaikh

(10) Patent No.: US 8,842,541 B2
(45) Date of Patent: Sep. 23, 2014

(54) PROVIDING POLICIES USING A DIRECT INTERFACE BETWEEN NETWORK DEVICES

(75) Inventor: Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 116 days.

(21) Appl. No.: 13/602,775

(22) Filed: Sep. 4, 2012

(65) Prior Publication Data
US 2014/0064094 A1  Mar. 6, 2014

(51) Int. Cl.
*H04L 5/12* (2006.01)

(52) U.S. Cl.
USPC .......................................................... 370/236

(58) Field of Classification Search
CPC .................................................... H04W 48/16
USPC .......................................................... 370/236
See application file for complete search history.

(56) References Cited

U.S. PATENT DOCUMENTS

| 6,470,029 | B1 * | 10/2002 | Shimizu ........................ 370/468 |
| 7,899,019 | B1 * | 3/2011 | Evans et al. .................... 370/338 |
| 8,185,152 | B1 * | 5/2012 | Goldner ......................... 455/552.1 |
| 2010/0003980 | A1 * | 1/2010 | Rune et al. ..................... 455/436 |
| 2010/0290448 | A1 * | 11/2010 | Rune .............................. 370/338 |
| 2011/0225319 | A1 * | 9/2011 | Aso et al. ....................... 709/238 |
| 2011/0264913 | A1 * | 10/2011 | Nikander et al. ............. 713/168 |
| 2011/0317571 | A1 * | 12/2011 | Kokkinen et al. ............. 370/252 |
| 2012/0324100 | A1 * | 12/2012 | Tomici et al. .................. 709/224 |
| 2013/0070594 | A1 * | 3/2013 | Garcia Martin et al. ....... 370/235 |
| 2013/0143542 | A1 * | 6/2013 | Kovvali et al. ................. 455/418 |
| 2013/0232555 | A1 * | 9/2013 | Zhang et al. ....................... 726/4 |
| 2013/0258865 | A1 * | 10/2013 | Kovvali et al. ................. 370/241 |
| 2013/0301609 | A1 * | 11/2013 | Smith et al. .................... 370/331 |
| 2013/0310030 | A1 * | 11/2013 | Ventimiglia et al. ........... 455/434 |

OTHER PUBLICATIONS

3rd Generation Partnership Project, Technical Specification Group Services and System Aspects; 3GPP System—Fixed Broadband Access Network Interworking; Stage 2 (Release 11), 3GPP TS 23.139, V11.1.0, Jun. 2012, 88 pages.
3rd Generation Partnership Project, Technical Specification Group Services and System Aspects; Study on Support of BBF Access Interworking (Release 11), 3GPP TS 23.839, V1.4.1, Dec. 2011, 152 pages.

* cited by examiner

*Primary Examiner* — Asad Nawaz
*Assistant Examiner* — Syed S Ali

(57) ABSTRACT

A first device is configured to store network load information regarding one or more network devices connected to the first device. Each one of the one or more network devices may have a connection range. The first device is further configured to receive information regarding a second device. The information regarding the second device may include information identifying a network device, of the one or more network devices, in which the second device is within connection range of and network load information regarding the network device in which the second device is within connection range of. The first device is further configured to provide the information regarding the second device to a third device; receive, from the third device, a first policy based on providing the information regarding the second device to the third device; and provide the first policy to the second device.

22 Claims, 9 Drawing Sheets

600

610

| Header | |
|---|---|
| MDN | 3579320045214 |
| IMSI | 404685505601234 |
| ICCID | 8991101200003240000 |

| Policy Trigger | Policies |
|---|---|
| Network devices within range = network device A, network device B, and network device C<br>User device activity = video | Cause user device to connect to network device A<br>Set user device bandwidth to 10 Mbps |
| Geographic location = 38.907,-76.864 | Provide content associated with geographic location |
| Time = 9:00 PM | Provide vendor discounts for online content |
| Geographic location = 38.907,-76.864<br>Time = 9:00 PM | Provide content associated with sports event at geographic location |
| Connected to network device A at 9:00 PM | Offer video associated with geographic location |
| RAT Type = WLAN | Set user device bandwidth to 10 Mbps |
| RAT Type = Cellular | Set user device bandwidth to 5 Mbps |

PROVIDING POLICIES USING A DIRECT INTERFACE BETWEEN NETWORK DEVICES

BACKGROUND

Users sometimes use user devices to perform some task (e.g., sending and/or receiving electronic mail (e-mail) messages, placing telephone calls to other user devices, browsing the internet, etc.). User devices connect to a local area network (LAN) or a cellular network to send and receive data associated with performing a task. A network device, associated with a cellular network, may provide policies to the user device to improve user experience. Connecting the user device to the cellular network to send and receive data, however, may increase cellular network traffic.

BRIEF DESCRIPTION OF THE DRAWINGS

FIG. 6 illustrates an example data structure that may be stored by one or more devices in the environment of FIG. 2, such as a policy and charging rules function device;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may allow a user device to receive a single set of policies, associated with a cellular network, when the user device connects to a LAN (e.g., to reduce cellular network traffic). For example, the systems and/or methods may direct the user device to connect to the LAN (e.g., a wireless LAN (WLAN) having a connection range) to perform some task (e.g., browsing the internet, sending and/or receiving messages, placing telephone calls, etc.), thereby reducing traffic, associated with the cellular network. Additionally, the systems and/or methods may provide the user device with policies, associated with the cellular network, via an interface between a policy device and a LAN selecting device. As a result, the user device may receive policies originating from the cellular network while reducing cellular network traffic when the user device connects to the LAN. Further, the user device may receive a single set of policies, originating from the cellular network, thereby eliminating the possibility of the user device receiving conflicting policies.

In some implementations, the user device may receive policies to improve user experience, such as policies that direct the user device to receive content (e.g., photos, videos, information, etc.) associated with a geographic location of the user device. Additionally, or alternatively, the user device may receive policies that direct the user device to connect to a particular network device, associated with a LAN, having lower network traffic than some other network device associated with the LAN. Additionally, or alternatively, the user device may receive policies that direct the user device to connect to a particular network device, associated with a LAN, when the user device enters the connection range of the network device and exits the connection range of some other network device. Additionally, or alternatively, the user device may receive policies that set the maximum and/or minimum bandwidth of the user device. Additionally, or alternatively, the user device may receive policies that direct the user device to perform some other task, such as sending and/or receiving data, based on a policy trigger (e.g., the time of day, the geographic location associated with the user device, etc.).

Figure 1:
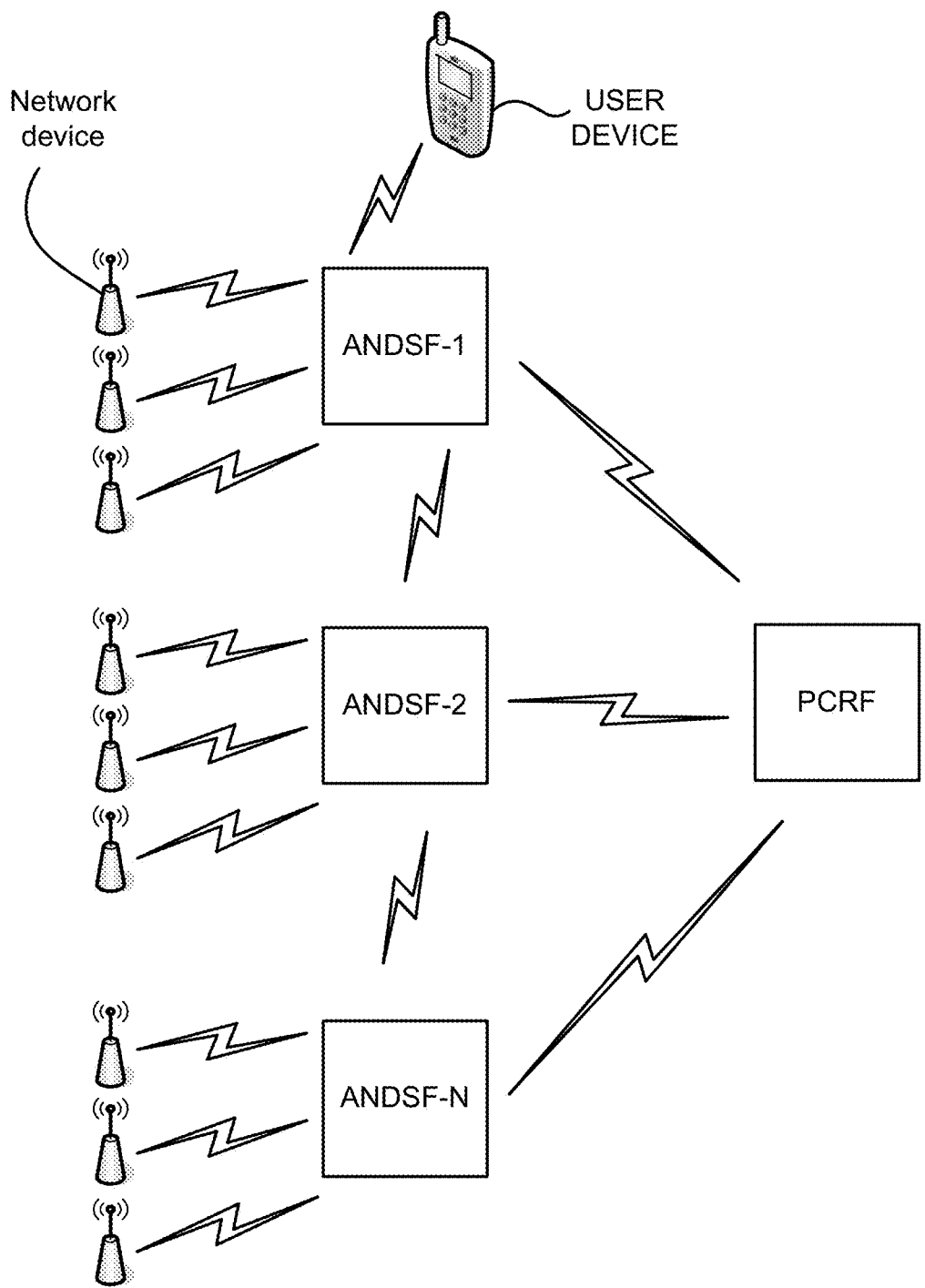
FIG. 1 illustrates an example overview of an implementation described herein.

FIG. 1 illustrates an example overview of an implementation described herein. In FIG. 1, a policy sending device associated with a cellular network, such as a policy and charging rules function device (herein after referred to as "PCRF"), may connect with a network selecting device, such as an Access Network Discovery Selection and Function device (hereinafter referred to as "ANDSF") to provide the user device with policies via the ANDSF. In some implementations, the interface between the PCRF and the ANDSF may be a diameter-based interface, an extensible markup language (XML)-based interface, a light-weight interface, or some other type of interface.

As further shown in FIG. 1, a single PCRF may connect with multiple ANDSFs (e.g., ANDSF-1, ANDSF-2 . . . ANDSF-N where N≥1). In some implementations, each ANDSF may be associated with a particular geographic region and may each connect with multiple network devices (e.g. access points, wireless routers, switches, and/or some other network devices or combination of network devices).

In FIG. 1, assume that a user device connects to an ANDSF (e.g., ANDSF-1) via a cellular network. In some implementations, the ANDSF may determine information regarding the user device based on the user device connecting to the ANDSF. For example, the ANDSF may determine information regarding the user device, such as a current geographic location, a radio access technology (RAT) type (e.g., the type of radio being used by the user device to access a network, such as a cellular radio type, a WLAN radio type, etc.). Additionally, or alternatively, the ANDSF may determine current user device activity (content playback activity, telephone call activity, etc.), a mobile device number (MDN), an international mobile subscriber identity (IMSI) number, an integrated circuit card identification (ICCID) number, and/or some other information associated with the user device. Additionally, or alternatively, the ANDSF may determine network devices, associated with the ANDSF, in which the user device is within connection range of and/or network load of the network devices in which the user device is within connection range of.

In some implementations, the ANDSF may provide the PCRF with information regarding the user device, information regarding network load of the network devices connected to the ANDSF and in which the user device is within connection range of, and/or some other information. In some implementations, the PCRF may provide the ANDSF with policies based on the information received from the PCRF such that the ANDSF may provide the policies to the user device. For example, and as described above, the PCRF may provide policies to improve user experience, such as policies that direct the user device to receive content (e.g., photos, videos, information, etc.) associated with a geographic location of the user device, policies to direct the user device to connect to a LAN via a network device associated with the ANDSF, and/or policies that direct the user device to perform some other task, such as sending and/or receiving data, based on some policy trigger (e.g., the time of day, the geographic location associated with the user device, etc.).

As a result, the user device may receive policies, associated with the cellular network, when the user device is connected to a LAN (e.g., via a network device associated with the ANDSF), thereby reducing cellular network traffic while providing the user device with policies associated with the cellular network.

In some implementations, the user device may connect to an ANDSF via a network device connected to the ANDSF independently of the cellular network. The user device may receive policies, associated with the cellular network, by providing the ANDSF with credentials associated with the cellular network. In some implementations, the ANDSF may obtain information regarding the user device and provide the credentials and the information regarding the user device to the PCRF. In some implementations, the PCRF may identify the user device based on the credentials and may provide the user device (e.g., via the ANDSF) with policies associated with the user device based on the information regarding the user device.

Figure 2:
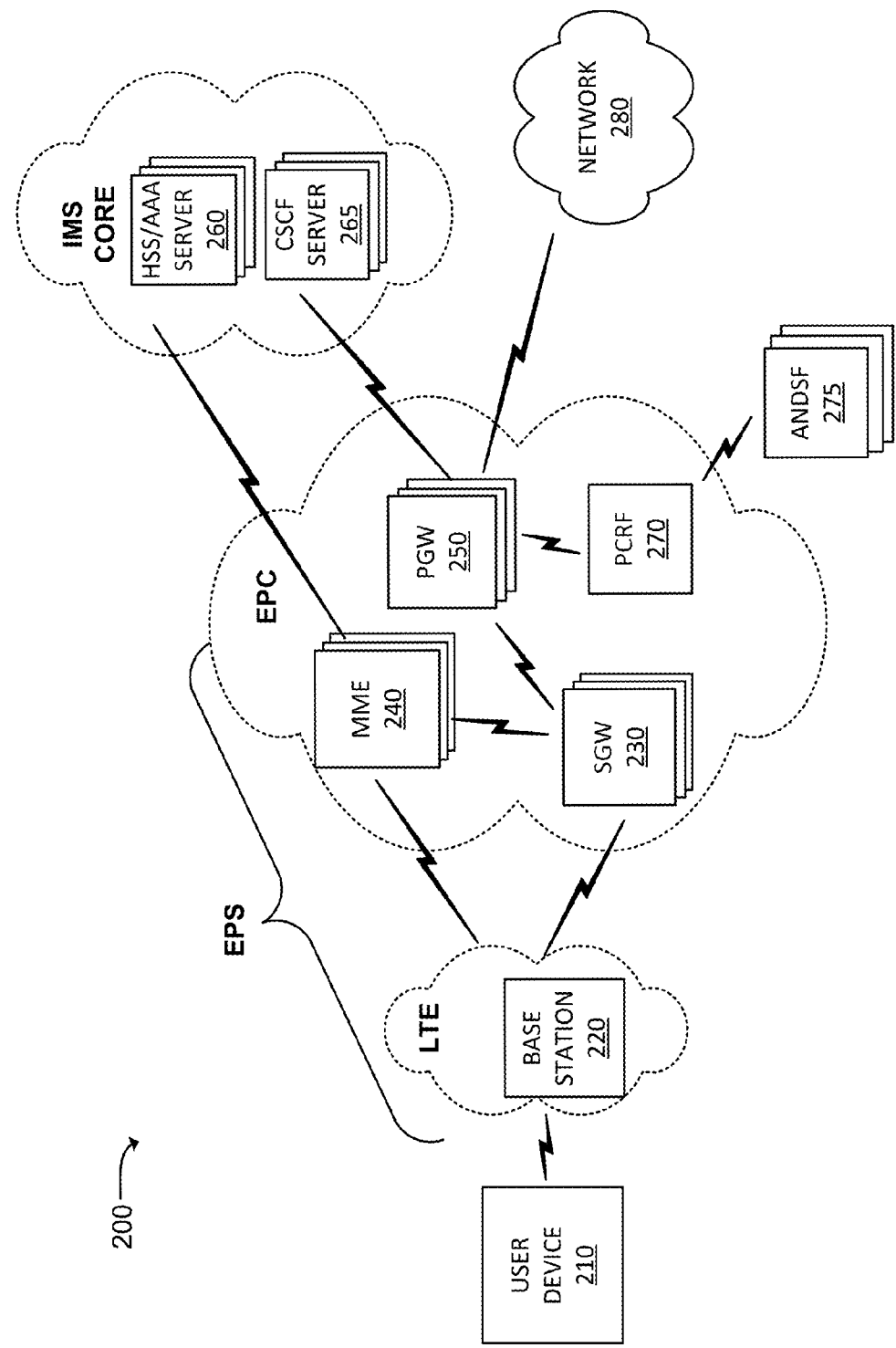
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, base station 220, serving gateway 230 (hereinafter referred to as "SGW 230"), mobility management entity device 240 (hereinafter referred to as "MME 240"), packet data network (PDN) gateway 250 (hereinafter referred to as "PGW 250"), home subscriber server (HSS)/authentication, authorization, accounting (AAA) server 260 (hereinafter referred to as "HSS/AAA server 260"), call session control function server 265 (hereinafter referred to as "CSCF server 265"), PCRF 270, ANDSF 275, and a network 280. The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

In some implementations, base station 220 may communicate with MME 240 over an S1-MME interface. Additionally, or alternatively, base station 220 may communicate with SGW 230 over an S1-4 interface. SGW 230 may communicate with PGW 250 over an S5 interface, and PGW 250 may interface with PCRF 270 over a Gx interface. In some other implementations, base station 220, SGW 230, MME 240, PGW 250, and/or PCRF 270 may communicate with each other using some other interface or combination of interfaces.

Environment 200 may include an evolved packet system (EPS) having a long term evolution (LTE) network and/or an evolved packet core (EPC) that operates based on a third generation partnership project (3GPP) wireless communication standard. The LTE network may be a radio access network (RAN) that includes one or more base stations 220, such as eNodeBs (eNBs), via which user device 210 communicates with the EPC. The EPC may include SGW 230, MME 240, PGW 250, and/or PCRF 270 that enables user device 210 to communicate with network 280 and/or an Internet protocol (IP) multimedia subsystem (IMS) core. As shown in FIG. 2, the IMS core may include HSS/AAA server 260 and/or CSCF server 265. In some implementations, the IMS core may manage authentication, session initiation, account information, a user profile, etc. associated with user device 210. The LTE network may include multiple base stations 220, and the EPC may include multiple SGWs 230, MMEs 240, PGWs 250, and/or PCRFs 270. The IMS core may include multiple HSS/AAA servers 260 and/or CSCF servers 265.

User device 210 may include any portable device capable of communicating via a network, such as network 280, a cellular network, an LTE network, or some other network. For example, user device 210 may correspond to a mobile communication device (e.g., a smart phone or a personal digital assistant (PDA)), a portable computer device (e.g., a laptop or a tablet computer), a gaming device, or another type of device. In some implementations, user device 210 may communicate with HSS/AAA server 260, CSCF server 265, and/or network 280 to perform a task, such as placing a telephone call, sending and/or receiving e-mail, accessing web pages on the internet, etc., via base station 220, SGW 230, MME 240, PGW 250, and/or some other device.

Base station 220 may include one or more network devices, such as a router, a switch, an eNB device, or some other device. In some implementations, base station 220 may be part of the LTE network. Base station 220 may include a device that receives, processes, and/or transmits network data, such as audio, video, text, and/or other data, destined for and/or received from user device 210. Base station 220 may receive network data from and/or send data to network 280 via SGW 230 and PGW 250. Base station 220 may send network data to and/or receive data from user device 210 via a wired or wireless interface. One or more base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers network data. For example, SGW 230 may aggregate network data (e.g., network data associated with an instruction to perform some task on behalf of user device 210) received from one or more base stations 220 and may send the aggregated network data to network 280 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more network devices that gather, process, search, store, and/or provide information in a manner described herein. For example, MME 240 may perform operations associated with a handoff to and/or from the EPS. MME 240 may perform operations to register user device 210 with the EPS, to hand off user device 210 from the EPS to another network, to hand off a user device 210 from the other network to the EPS, and/or to perform other operations. MME 240 may perform policing operations for data destined for and/or received from user device 210.

PGW 250 may include one or more network devices that gather, process, search, store, and/or provide information in a manner described herein. PGW 250 may include one or more data processing and/or data transfer devices, such as a gateway, a router, a modem, a switch, a firewall, a NIC, a hub, a bridge, a proxy server, an OADM, or some other type of device that processes and/or transfers data. PGW 250 may, for example, provide connectivity of user device 210 to external packet data networks by being a data exit/entry point for user device 210. PGW 250 may perform policy enforcement, packet filtering, charging support, lawful intercept, and packet screening. PGW 250 may also act as an anchor for mobility between 3GPP and non-3GPP technologies. PGW 250 may authenticate user device 210 (e.g., via interaction with HSS/AAA server 260).

HSS/AAA server 260 may include one or more network devices, or other types of computation or communication devices, that gather, process, search, store, and/or provide information in a manner described herein. For example, HSS/AAA server 260 may manage, authenticate, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 265 may include one or more network devices, or other types of computation or communication devices, that gather, process, search, store, and/or provide information in a manner described herein. CSCF server 265 may process and/or route calls to and from user device 210 via the EPC. For example, CSCF server 265 may process calls, received from network 280, that are destined for user device 210. In another example, CSCF server 265 may process calls, received from user device 210, that are destined for network 280.

PCRF 270 may include one or more network devices, or other types of computation or communication devices, that gather, process, search, and/or provide information in a manner described herein. PCRF 270 may also store subscriber information, such as voice call and data rate plans or quotas for subscribers associated with user device 210. PCRF 270 may provide network control regarding service data flow detection, gating, Quality of Service (QoS), and/or flow based charging. Policies and rules regarding QoS may include policies and rules instructing user device 210 and network elements (base station 220, SGW 230, MME 240, PGW 250, ANDSF 275, etc.) to minimize packet loss, to implement a packet delay budget, to provide a guaranteed bit rate (GBR), to provide low latency, and/or to perform other activities associated with QoS. PCRF 270 may provide policies and rules to other network devices, such as HSS/AAAS server 260, ANDSF 275, and/or PGW 250, to implement network control. PCRF 270 may determine how a certain service data flow shall be treated, and may ensure that user plane data mapping and QoS is in accordance with a user's profile and/or network policies.

In some implementations, PCRF 270 may receive information regarding user device 210 (e.g., geographic location data, RAT type, a wide area network identifier (WAN ID) of a network device connected to user device 210, network load information for network devices, associated with ANDSF 275, in which user device 210 is within connection range of, etc.), and may provide policies and rules to multiple ANDSFs 275 based on the information regarding user device 210. Additionally, or alternatively, PCRF 270 may increase network bandwidth of user device 210 based on user device 210 connecting to a LAN (e.g., a WLAN associated with a network device connected to ANDSF 275). Additionally, or alternatively, PCRF 270 may decrease network bandwidth of user device 210 based on user device 210 disconnecting from a LAN.

ANDSF 275 may include one or more network devices, or other types of computation or communication devices, that gather, process, search, and/or provide information in a manner described herein. In some implementations, multiple network devices (e.g., access points, routers, switches, gateways, or some other network device) may connect to ANDSF 275 and to user device 210 to allow user device 210 to access network 280 via a network device connected to ANDSF 275. In some implementations, ANDSF 275 may monitor network load associated with network devices connected to ANDSF 275. Additionally, ANDSF 275 may receive information regarding user device 210 (e.g., geographic location data, RAT type, a WAN ID of a network device connected to user device 210, network devices, associated with ANDSF 275, in which user device 210 is within connection range of, etc.) and provide the information regarding user device 210 to PCRF 270. In some implementations, ANDSF 275 may receive policies from PCRF 270 and may apply the policies to user device 210 (e.g., ANDSF 275 may install policies on user device 210 or direct user device 210 to receive data based on the policies received from PCRF 270).

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PTSSN)), an ad hoc network, a managed IP network, a virtual private network (VPN), an intranet, the Internet, a fiber optic-based network, and/or combination of these or other types of networks.

Figure 3:
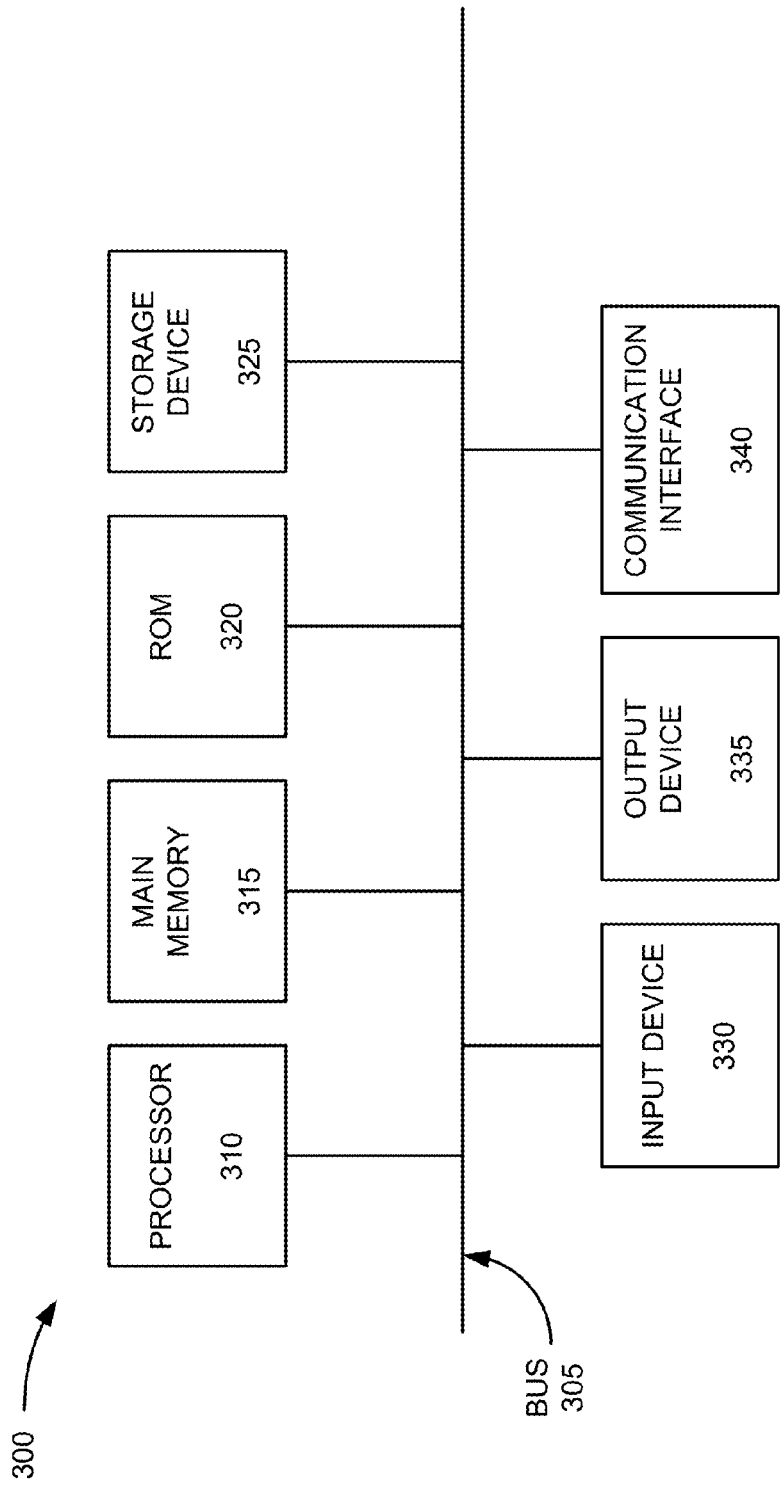
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, HSS/AAA server 260, CSCF server 265, PCRF 270, and/or ANDSF 275. Each of user device 210, base station 220, SGW 230, MME 240, PGW 250, HSS/AAA server 260, CSCF server 265, PCRF device PCRF 270, and/or ANDSF 275 may include one or more devices 300, and/or one or more components of device 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
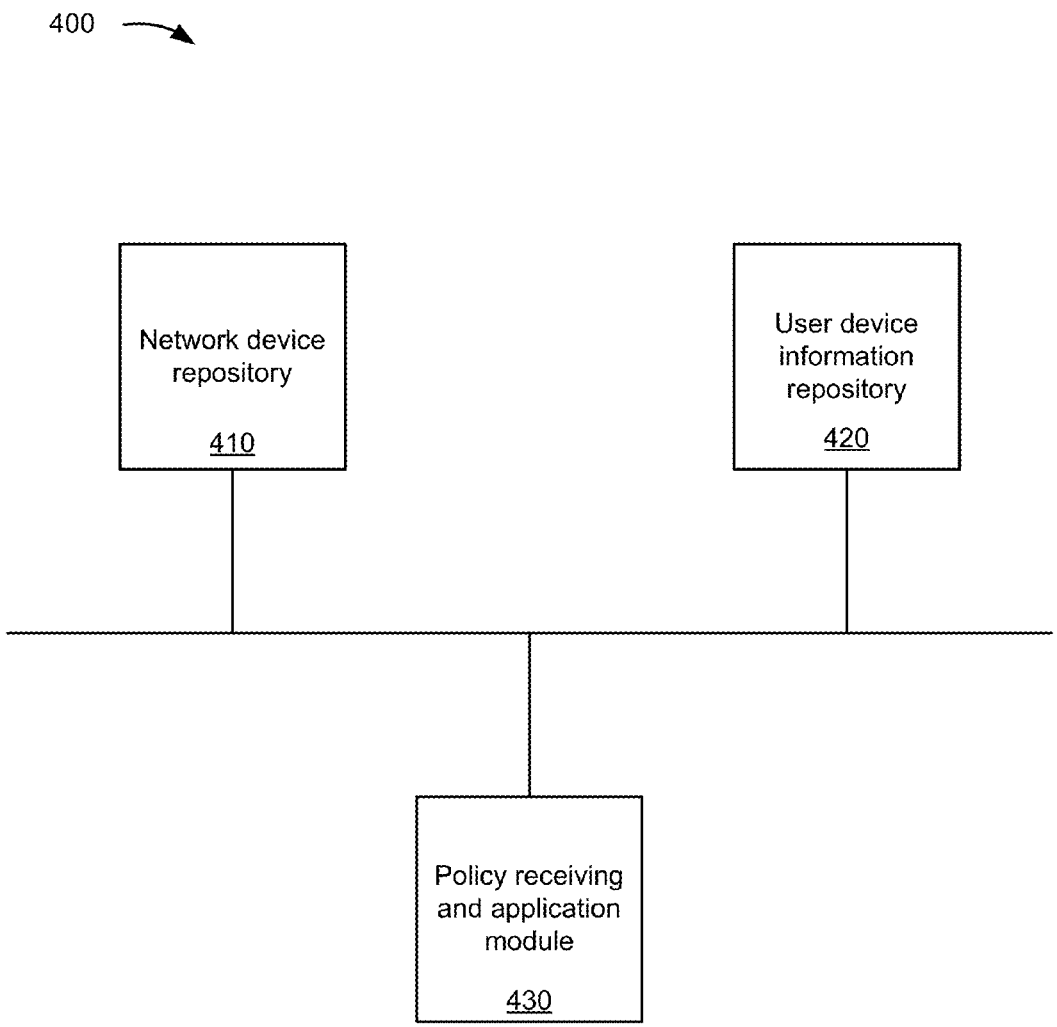
FIG. 4 illustrates example functional components of an example system.

FIG. 4 illustrates example functional components of an example system 400. In some implementations, system 400 may include functional components implemented by a device, such as ANDSF 275. In some other implementation, system 400 may include functional components implemented by one or more devices, which include or exclude ANDSF 275. For example, SGW 230, MME 240, PGW 250, HSS/AAA server 260, CSCF server 265, and/or PCRF 270 may include some or all of the functional components of system 400.

As shown in FIG. 4, system 400 may include network device repository 410, user device information repository 420, and policy receiving and application module 430.

Network device repository 410 may receive and/or store information regarding a network device associated with ANDSF 275. For example, network device repository 410 may receive and/or store information such as a WAN ID, hardware device ID, a geographic location, and/or some other information for the network device associated with ANDSF 275. Additionally, network device repository 410 may store information identifying network load for the network device. In some implementations, ANDSF 275 may identify a network device, associated with ANDSF 275, in which user device 210 is within connection range of, and network load for the network device in which user device 210 is within connection range of based on information stored by network device repository 410.

User device information repository 420 may receive and store information regarding user device 210, such as geographic location data, a RAT type, a wide area network identifier (WAN ID) of a network device connected to user device 210, network devices, associated with ANDSF 275, in which user device 210 is within connection range of, etc. In some implementations, user device information repository 420 may identify network devices, associated with ANDSF 275, in which user device 210 is within connection range of based on information stored by network device repository 410. User device information repository 420 may send the information regarding user device 210 to PCRF 270.

Policy receiving and application module 430 may receive policies from PCRF 270 based on user device information repository 420 providing information regarding user device 210 to PCRF 270. As described above, policies received from PCRF 270 may include policies to direct user device 210 to connect to a particular network device, associated with ANDSF 275, policies to provide user device 210 with content associated with a current geographic location of user device 210, policies to set available bandwidth of user device 210, etc.

In some implementations, policy receiving and application module 430 may apply and/or provide the policies received from PCRF 270 to user device 210. For example, policy receiving and application module 430 may install policies on user device 210 or may communicate with a device in network 200 to provide user device 210 with data corresponding to policies received by PCRF 270 (e.g., ANDSF 275 may communicate with HSS/AAA server 260 to provide user device 210 with content corresponding to a policy to provide user device 210 with content based on a current geographic location of user device 210). Additionally, or alternatively, policy receiving and application module 430 may provide policies to user device 210 based on some other technique.

Figure 5:
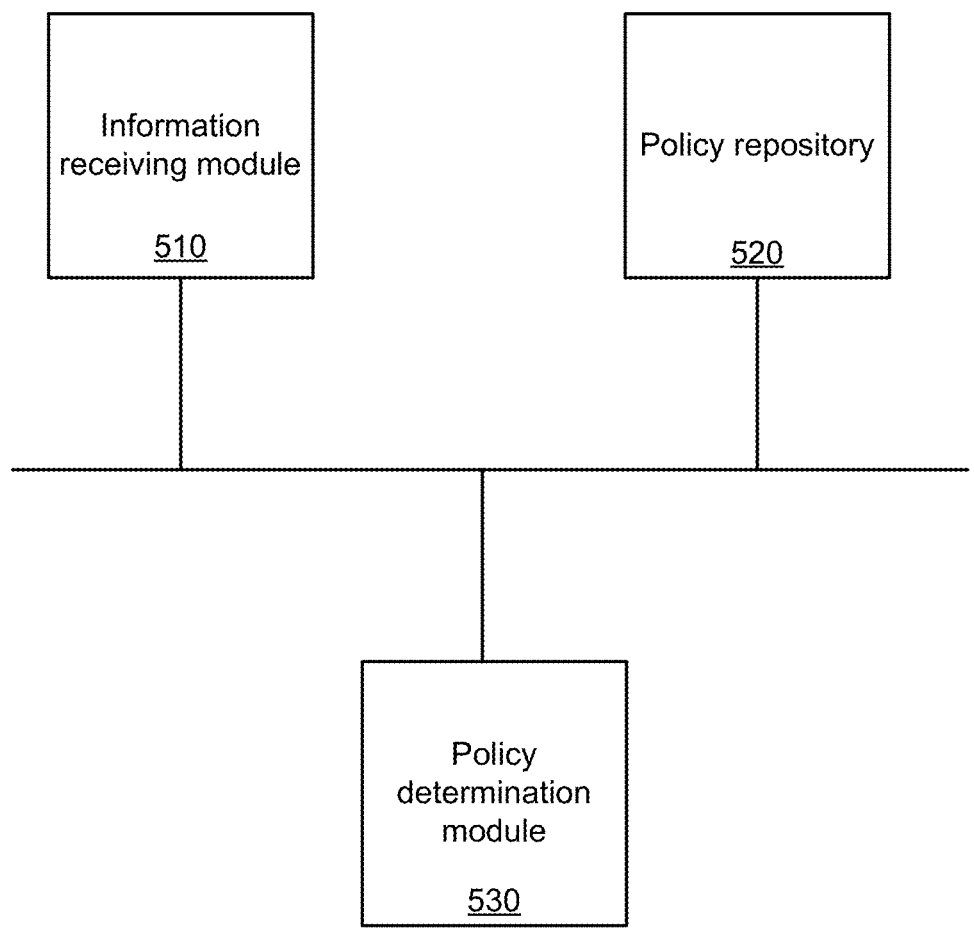
FIG. 5 illustrates example functional components of an example system.

FIG. 5 illustrates example functional components of an example system 500. In some implementations, system 500 may include functional components implemented by a device, such as PCRF 270. In some other implementation, system 500 may include functional components implemented by one or more devices, which include or exclude PCRF 270. For example, SGW 230, MME 240, PGW 250, HSS/AAA server 260, CSCF server 265, and/or ANDSF 275 may include some or all of the functional components of system 500.

As shown in FIG. 5, system 500 may include information receiving module 510, policy repository 520, and policy determination module 530.

Information receiving module 510 may receive and/or store information regarding user device 210 from user device information repository 420. For example, information receiving module 510 may receive information regarding user device 210, such as geographic location data, RAT type, a wide area network identifier (WAN ID) of a network device connected to user device 210, network devices, associated with ANDSF 275, in which user device 210 is within connection range of, network load of network devices in which user device 210 is within connection range of, etc.

Policy repository 520 may store policies for user device 210 based on information regarding user device 210 and/or a policy trigger. For example, policy repository 520 may store a policy to direct user device 210 to connect to a network device, associated with ANDSF 275 when user device 210 is within connection range of the network device associated with ANDSF 275. Additionally, or alternatively, policy repository 520 may store a policy to provide user device 210 with particular content when user device 210 is at a particular geographic location. Additionally, or alternatively, policy repository 520 may store a policy to provide user device 210 with vendor discounts for online content based on a particular time of day. Additionally, or alternatively, policy repository 520 may store a policy to set the bandwidth of user device 210 to a particular value based on a RAT type of user device 210. For example, policy repository 520 may store a policy to set the bandwidth of user device 210 to 5 megabits per second (Mbps) based on a cellular RAT type and a policy to set the bandwidth of user device 210 to 10 Mbps based on a WLAN RAT type. While specific examples of policies stored by policy repository 520 are described above, in practice, policy repository 520 may store policies based on any policy trigger or based on any information regarding user device 210.

Policy determination module 530 may determine a policy for user device 210 based on information stored by policy repository 520. For example, policy determination module 530 may determine a policy to provide user device 210 with particular content when user device 210 is at a particular geographic location based on information stored by policy repository 520. Additionally, or alternatively, policy determination module 530 may determine a policy to direct user device 210 to connect a network device associated with ANDSF 275, thereby reducing cellular network traffic. Additionally, or alternatively, policy determination module 530 may determine some other policy based on information stored by policy repository 520. In some implementations, policy repository 520 may provide the policy to policy receiving and application module 430 such that policy receiving and application module 430 may receive the policy and apply the policy to user device 210. As a result, user device 210 may receive a single set of policies when connected to a network device, associated with ANDSF 275.

FIG. 6 illustrates an example data structure 600 that may be stored by one or more devices in environment 200, such as PCRF 270. In one implementation, data structure 600 may be stored in a memory of PCRF 270. In another implementation, data structure 600 may be stored in a memory separate from, but accessible by PCRF 270. In some implementations, data structure 600 may be stored by some other device in environment 200, such as SGW 230, MME 240, PGW 260, HSS/AAA server 260, CSCF server 265, and/or ANDSF 275.

A particular instance of data structure 600 may contain different information and/or fields than another instance of data structure 600. In some implementations, data structure 600 may correspond to information stored by policy repository 520. One instance of data structure 600 may store policies associated with one user device 210 in environment 200, whereas another instance of data structure 600 may store policies associated with another user device 210 in environment 200.

As shown in FIG. 6, data structure 600 may include header field 610, policy trigger field 620, and/or policies field 630. In some implementations, data structure 600 may include additional fields, fewer fields, different fields, or differently arranged fields than are shown in FIG. 6.

Header field 610 may include information identifying a particular user device 210 with which data structure 600 is associated. For example, as described above, each instance of data structure 600 may store policies associated with a particular user device 210 in environment 200. As shown in FIG. 6, header field 610 may store information for user device 210, such as an MDN, an IMSI number, and/or an ICCID number. Additionally, or alternatively, header field 610 may store some other identifier to identify user device 210.

Policy trigger field 620 may store information for policy triggers relating to user device 210. For example, policy trigger field 620 may store information identifying network devices, associated with ANDSF 275, in which user device 210 is within connection range of, device activity of user device 210 (e.g., content playback activity, telephone call activity, etc.), geographic location information of user device 210 (e.g., longitude/latitude coordinates), and/or some other information regarding user device 210. Additionally, or alternatively, policy trigger field 620 may store some other policy trigger, such as a time of day or a combination of policy triggers.

As shown in FIG. 6, an example of information stored by policy trigger field 620 may include an indication that user device 210 is within connection range of three network devices associated with ANDSF 275 (e.g., network device A, network device B, and network device C) and an indication that user device 210 is currently accessing video content. Additionally, information stored by policy trigger field 620 may include WAN IDs for each of network device A, network device B, and network device C and/or network load information associated with each of network device A, network device B, and network device C. In practice, it will be apparent that information stored by policy trigger field 620 may include information for any number of network devices associated with ANDSF 275.

Policies field 630 may store information identifying policies corresponding to information stored by policy trigger field 620. As shown in FIG. 6, an example of information stored by policies field 630 may include policy information to direct user device 210 to connect to network device A and to set the bandwidth of user device 210 to 10 Mbps corresponding to information stored by policy trigger field 620 (e.g., an indication that user device 210 is within connection range of network device A, network device B, and network device C; network load associated with each of network device A, network device B, and network device C; and/or an indication that user device 210 is currently accessing video content). In some implementations, ANDSF 275 may receive policies based on information stored by policies field 630. As a result, user device 210 may receive policies originated from PCRF 270 in a situation where user device 210 is connected to network 280 via a network device associated with ANDSF 275.

Figure 7:
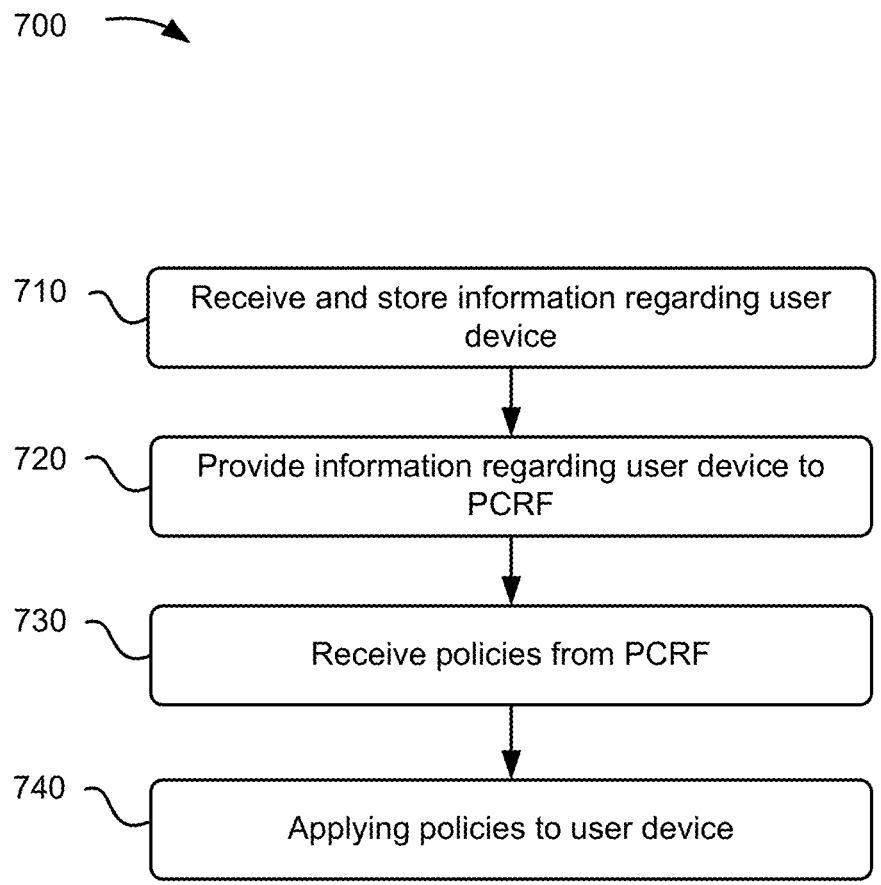
FIG. 7 illustrates a flowchart of an example process for receiving and applying policies to a user device.

FIG. 7 illustrates a flowchart of an example process 700 for receiving and applying policies to user device 210. In one implementation, process 700 may be performed by one or more components of ANDSF 275. In another implementation, some or all of blocks of process 700 may be performed by one or more components of another device in environment 200 (e.g., SGW 230, MME 240, PGW 250, HSS/AAA server 260, CSCF 265, and/or PCRF 270), or a group of devices including or excluding ANDSF 275.

Process 700 may include receiving and storing information regarding user device 210 (block 710). For example, as described above with respect to user device information repository 420, ANDSF 275 may receive and store information regarding user device 210, such as geographic location data, RAT type, a wide area network identifier (WAN ID) of a network device connected to user device 210, network devices, associated with ANDSF 275, in which user device 210 is within connection range of, etc.

Process 700 may further include providing information regarding user device 210 to PCRF 270 (block 720). For example, as described above with respect to user device information repository 420, ANDSF 275 may send the information regarding user device 210 to PCRF 270 based on receiving the information regarding user device 210. In some implementations, PCRF 270 may send the information regarding user device 210 to PCRF 270 using a secure channel protocol (e.g., an HTTPS protocol) and/or some other protocol.

Process 700 may also include receiving policies from PCRF 270 (block 730). For example, as described above with respect to policy receiving and application module 430, ANDSF 275 may receive policies from PCRF 270 based on ANDSF 275 providing information regarding user device 210 to PCRF 270. As described above, policies received from PCRF 270 may include policies to direct user device 210 to connect to a particular network device, associated with ANDSF 275, policies to provide user device 210 with content associated with a current geographic location of user device 210, policies to set available bandwidth of user device 210, etc.

Process 700 may further include applying policies to user device 210 (block 740). For example, as described above with respect to policy receiving and application module 430, ANDSF 275 may apply the policies received from PCRF 270. For example, policy receiving and application module 430 may install policies on user device 210 or may communicate with a device in environment 200 to provide user device 210 with data corresponding to policies received by PCRF 270 (e.g., ANDSF 275 may communicate with HSS/AAA server 260 to provide user device 210 with content corresponding to a policy to provide user device 210 with content based on a current geographic location of user device 210).

Figure 8:
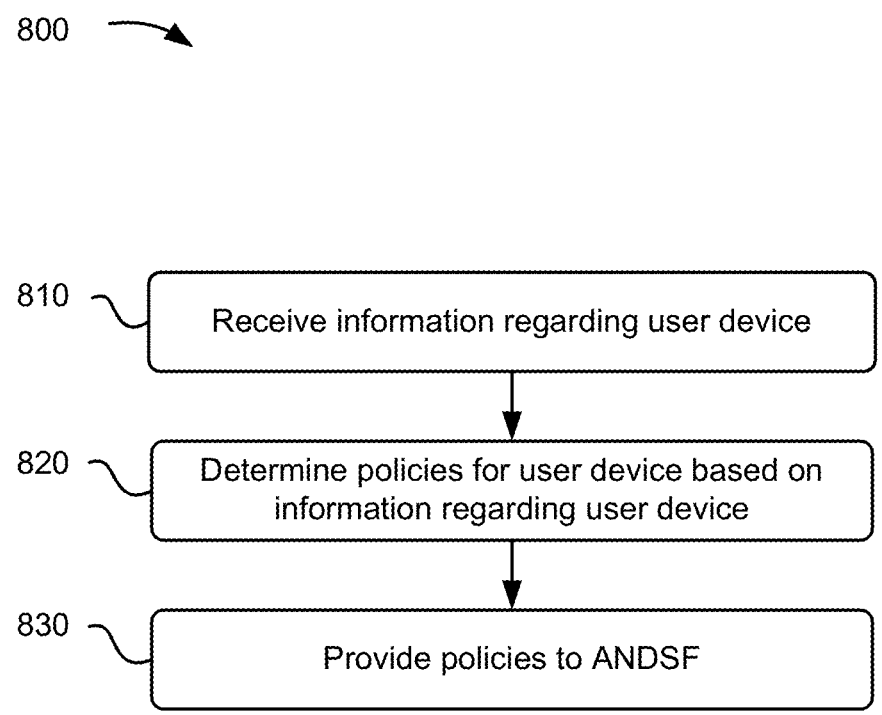
FIG. 8 illustrates a flowchart of an example process for determining policies for a user device and providing the policies to the user device via an Access Network Discovery Selection and Function device.

FIG. 8 illustrates a flowchart of an example process for determining policies for user device 210 and providing the policies to user device 210 via ANDSF 275. In one implementation, process 800 may be performed by one or more components of PCRF 270. In another implementation, some or all of blocks of process 800 may be performed by one or more components of another device (e.g., SGW 230, MME 240, PGW 250, HSS/AAA server 260, CSCF server 265, and/or ANDSF 275), or a group of devices including or excluding PCRF 270.

Process 800 may include receiving information regarding user device 210 (block 810). For example, as described above with respect to information receiving module 510, PCRF 270 may receive information regarding user device 210, such as geographic location data, RAT type, a wide area network identifier (WAN ID) of a network device connected to user device 210, network devices, associated with ANDSF 275, in which user device 210 is within connection range of, etc. In some implementations, PCRF 270 may receive the information regarding user device 210 from ANDSF 275 as described above.

Process 800 may also include determining policies for user device 210 based on information regarding user device 210 (block 820). For example, as described above with respect to policy determination module 530, PCRF 270 may determine a policy for user device 210 based on information stored by policy repository 520 and based on the information regarding user device 210. As described above, PCRF 270 may determine policies to direct user device 210 to receive content (e.g., photos, videos, information, etc.) associated with a geographic location of user device 210, policies that direct user device 210 to connect to a particular network device when user device 210 enters the connection range of the network device, policies that set the maximum and/or minimum bandwidth of user device 210, etc.

Process 800 may further include providing the policies to ANDSF 275 (block 830). For example, as described above with respect to policy receiving and application module 430, PCRF 270 may send the policies to ANDSF 275 based on determining the policies. In some implementations, PCRF 270 may send the policies to ANDSF 275 using a secure channel protocol (e.g., an HTTPS protocol) and/or some other protocol. As described above, PCRF 270 may provide the policies to ANDSF 275 such that ANDSF 275 may apply the policy to user device 210. As a result, user device 210 may receive policies when accessing network 280 via a network device, associated with ANDSF 275.

Figure 9:
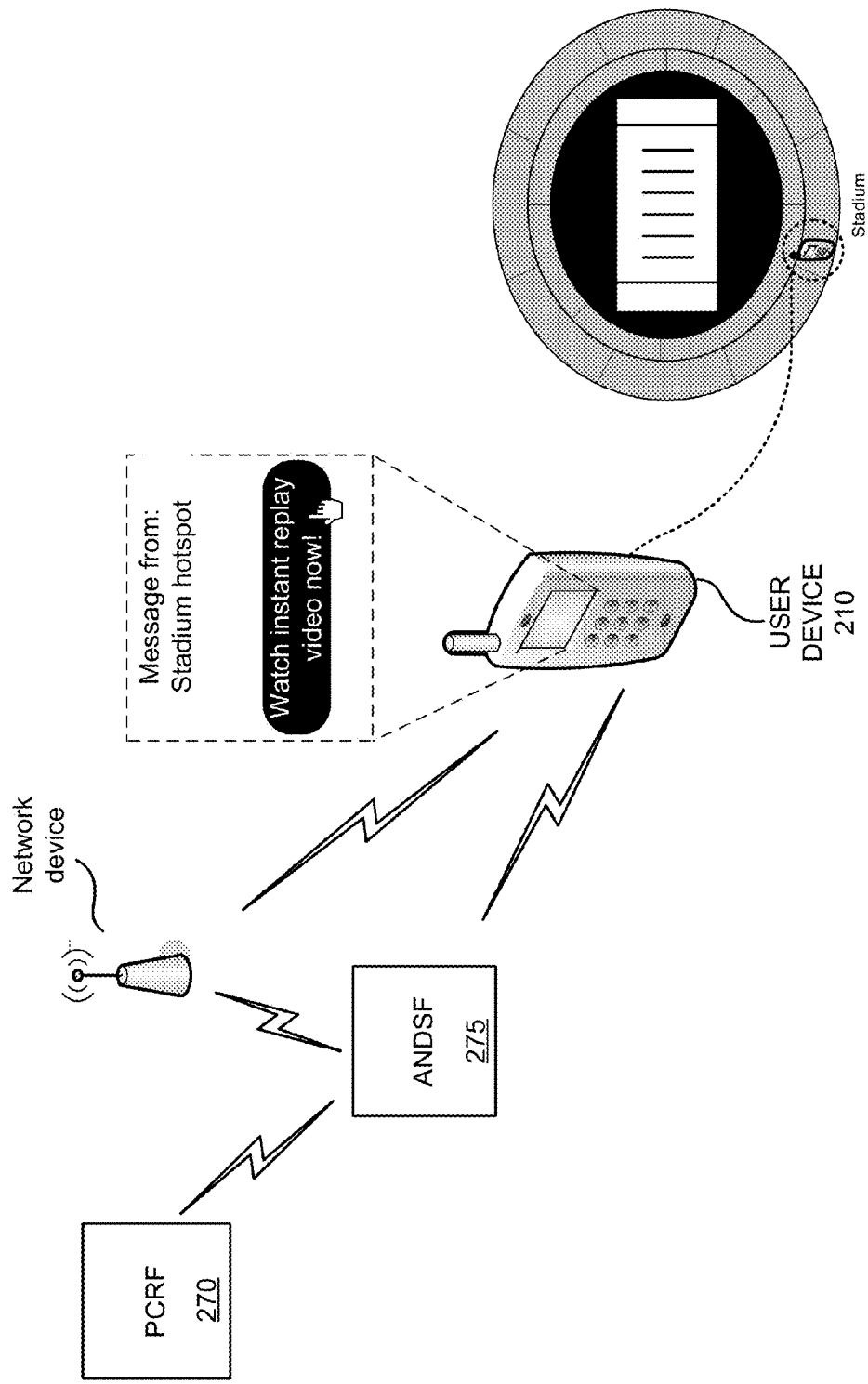
FIG. 9 illustrates an example implementation as described herein.

FIG. 9 illustrates an example implementation as described herein. In FIG. 9, assume that user device 210 is located in a particular geographic location (e.g., a public stadium) at a particular time of day. As shown in FIG. 9, user device 210 may connect to ANDSF 275 via a cellular network (e.g., via base station 220). As described above, ANDSF 275 may receive information regarding user device 210 (e.g., geographic location, etc.) and may provide the information regarding user device 210 to PCRF 270. PCRF 270 may determine policies based on the information regarding user device 210 and provide the policies to ANDSF 275. In some implementations, ANDSF 275 may apply the policies to user device 210, as described above. As shown in FIG. 9, the policies may direct user device 210 to connect to a network device, associated with ANDSF 275, and to receive content (e.g., audio, video, or some other content), based on the geographic location of user device 210 and based on the time of day. As a result, user device 210 may connect to the network device, thereby reducing cellular network traffic, while receiving policies associated with the cellular network.

The foregoing description provides illustration and description, but is not intended to be exhaustive or to limit the possible implementations to the precise form disclosed. Modifications and variations are possible in light of the above disclosure or may be acquired from practice of the implementations. For example, while series of blocks have been described with regards to FIGS. 7-8, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
  storing, by a first device, network load information regarding one or more network devices connected to the first device, each network device, of the one or more network devices, having a connection range and being associated with a first network;
receiving, by the first device, information regarding a second device,
the information regarding the second device including information identifying a network device, of the one or more network devices, in which the second device is within connection range of and network load information regarding the network device;
providing, by the first device, the information regarding the second device to a third device;
receiving, by the first device and from the third device, a first policy based on providing the information regarding the second device to the third device,
the first policy including an instruction to direct the second device to connect to the first network via one of the one or more network devices associated with the first device based on the network load information of the one or more network devices;
providing, by the first device, the first policy to the second device;
receiving, by the first device and from the third device and based on providing the information regarding the second device, a second policy,
the second policy including an instruction to set a maximum bandwidth of the second device based on an activity associated with the second device; and
providing, by the first device and to the second device, the second policy that sets the maximum bandwidth of the second device based on the activity associated with the second device.

2. The method of claim 1, where
the first policy directs the second device to connect to the first network via the one of the one or more network devices to reduce network traffic associated with a second network,
the first network is a local area network, and
the second network is a cellular network.

3. The method of claim 1,
where the second policy is received based on a current time.

4. The method of claim 1,
where the second policy includes an instruction to direct the second device to receive content based on a geographic location of the second device or a current time.

5. The method of claim 1,
where the activity associated with the second device includes the second device connecting to the one of the one or more network devices.

6. A system comprising:
a first device to:
store network load information regarding one or more network devices connected to the first device,
each network device, of the one or more network devices, having a connection range and being associated with a first network;
receive information regarding a second device,
the information regarding the second device including information identifying a network device, of the one or more network devices, in which the second device is within connection range of and network load information regarding the network device;
provide the information regarding the second device to a third device;
receive, from the third device, a first policy based on providing the information regarding the second device to the third device,
the first policy including an instruction to direct the second device to connect to the first network via one of the one or more network devices associated with the first device based on network load of the one of the one or more network devices;
provide the first policy to the second device;
receive a second policy, associated with a second network, from the third device based on providing the information regarding the second device to the third device,
the second policy including an instruction to set a maximum bandwidth of the second device based on an activity associated with the second device; and
provide the second policy to the second device that sets the maximum bandwidth of the second device based on the activity associated with the second device.

7. The system of claim 6, where the first network is a local area network and the second network is a cellular network.

8. The system of claim 6, where the second policy includes an instruction to direct the second device to receive content based on a geographic location of the second device or a current time.

9. The system of claim 6, where the second policy includes an instruction to set the maximum bandwidth of the second device based on the second device connecting to the one of the one or more network devices.

10. A non-transitory computer-readable medium storing instructions, the instructions comprising:
a plurality of instructions which, when executed by one or more processors associated with a first device, cause the one or more processors to:
store network load information regarding one or more network devices connected to the first device,
each network device, of the one or more network devices, having a connection range and being associated with a first network;
receive information regarding a second device,
the information regarding the second device including information identifying a network device, of the one or more network devices, in which the second device is within connection range of and network load information regarding the network device;
provide the information regarding the second device to a third device;
receive, from the third device, a first policy based on providing the information regarding the second device to the third device,
the first policy including an instruction to direct the second device to connect to the first network via one of the one or more network devices associated with the first device based on network load of the one of the one or more network devices;
provide the first policy to the second device;
receive a second policy, associated with a second network, from the third device based on providing the information regarding the second device to the third device,
the second policy including an instruction to set a maximum bandwidth of the second device based on an activity associated with the second device; and
provide the second policy to the second device, the first network being a local area network and the second network being a cellular network.

11. The non-transitory computer-readable medium of claim 10, where the second policy includes an instruction to direct the second device to receive content based on a geographic location of the second device or a current time.

12. The non-transitory computer-readable medium of claim 10, where the second policy includes an instruction to set the maximum bandwidth of the second device based on the second device connecting to the one of the one or more network devices.

13. A method comprising:
receiving, by a first device, information regarding a second device,
the information regarding the second device including network load information for one or more network devices, associated with a first network, connected to a third device in which the second device is within connection range of;
determining, by the first device, a first policy based on the information regarding the second device,
the first policy including an instruction to direct the second device to connect to one of the one or more network devices;
providing, by the first device, the first policy to the third device;
determining, by the first device, a second policy, associated with a second network, based on providing the first policy to the third device and based on the second device connecting to the first network via the one of the one or more network devices,
the second policy including an instruction to set a maximum bandwidth of the second device based on an activity associated with the second device; and
providing, by the first device, the second policy to the third device that sets the maximum bandwidth of the second device based on the activity associated with the second device.

14. The method of claim 13, where
the third device provides the first policy to the second device to connect the second device to the first network via the one of the one or more network devices to reduce network traffic associated with a second network,
the first network is a local area network, and
the second network is a cellular network.

15. The method of claim 13, further comprising:
receiving geographic information associated with the second device,
where the information regarding the second device includes the geographic information associated with the second device,
where
determining the second policy is further based on the geographic information associated with the second device,
the second policy includes an instruction to direct the second device to receive data based on the geographic information, and
the third device provides the second policy to the second device to direct the second device to receive data based on the geographic information.

16. The method of claim 13, where second policy includes an instruction to direct the second device to receive content based on a geographic location of the second device or a current time.

17. The method of claim 13, where the activity associated with the second device includes the second device connecting to the one of the one or more network devices.

18. A system comprising:
a first device to:
receive information regarding a second device,
the information regarding the second device including network load information for one or more network devices, associated with a first network, connected to a third device and in which the second device is within connection range of;
determine a first policy based on the information regarding the second device,
the first policy including an instruction to direct the second device to connect to one of the one or more network devices;
provide the first policy to the third device;
determine a second policy, associated with a second network, based on providing the first policy to the third device and based on the second device connecting to the first network via the one of the one or more network devices,
the second policy including an instruction to set a maximum bandwidth of the second device based on an activity associated with the second device; and
provide the second policy to the third device that sets the maximum bandwidth of the second device based on the activity associated with the second device.

19. The system of claim 18, where the first network is a local area network and the second network is a cellular network.

20. The system of claim 18, where
the first device is further to:
receive geographic information associated with the second device,
where the information regarding the second device includes the geographic information associated with the second device,
when determining the second policy, the first device is further to:
determine the second policy based on the geographic information associated with the second device,
the second policy includes an instruction to direct the second device to receive data based on the geographic information, and
the third device provides the second policy to the second device to direct the second device to receive data based on the geographic information.

21. The system of claim 18, where second policy includes an instruction to direct the second device to receive content based on a geographic location of the second device or a current time.

22. The system of claim 18, where the activity associated with the second device includes the second device connecting to the one of the one or more network devices.

* * * * *